Feb. 3, 1959  S. J. BUGBEE ET AL  2,872,400

REACTOR MONITORING

Filed March 28, 1946

Witnesses:

Inventors:
Stuart J. Bugbee
Victor F. Hanson
Dale F. Babcock
By:
Attorney

United States Patent Office 2,872,400
Patented Feb. 3, 1959

2,872,400

REACTOR MONITORING

Stuart J. Bugbee, Morgantown, W. Va., and Victor F. Hanson, Yorklyn, and Dale F. Babcock, Wilmington, Del., assignors to the United States of America as represented by the United States Atomic Energy Commission Application March 28, 1946, Serial No. 657,814

2 Claims. (Cl. 204—193.2)

This invention relates to neutronic reactors, and particularly to monitoring of neutronic reactors for determining the neutron density therein and the power output thereof.

As is more fully described in Fermi et al. Patent 2,708,656, dated May 17, 1955, one type of neutronic reactor comprises generally a neutron moderator mass which is traversed by a grid of parallel tubes in which fissionable material such as uranium is placed and, which due to chain nuclear reactions, is transmuted into another product by the capture of neutrons released in the reaction. The power generated depends in a large degree on the neutron density within the moderating mass and is dissipated as heat by water circulated through the tubes. Suitable controls are provided and the temperature and volume of the cooling water is monitored carefully. From the difference in water temperature at the inlet and outlet of each tube and the volume of water passing therethrough the power output of the tube can be determined accurately, correction being made for certain other known factors of heat dissipation. The sum of the output of all tubes, so corrected, reflects the total power output of the reactor.

However, a considerable time delay necessarily occurs between the accumulation of the data and the computations of output therefrom, and the results are usually the average output for a certain interval.

Nuclear reactions are very rapid and, if not carefully controlled, are extremely hazardous and it is very desirable to know promptly any changes in the power output and to determine the changes occurring for short time intervals.

It has been found that the power output is a function primarily of the neutron density. Consequently, by correlating the data relative to power output as determined from the cooling water and the neutron density, a formula has been devised by which power output can be determined promptly and with sufficient accuracy from a measurement of the neutron density within the pile.

In reactors of this type, the moderator generally is enclosed within thick thermal neutron and biological shields and difficulties are encountered in obtaining direct measurements of neutron density within the interior of the reactor or pile.

One of the principal objects of the present invention is to provide novel means which affords access of neutron density measuring instruments to a location wherein direct measurements of neutron density within the pile can be made and which, at the same time, affords ample protection to operating personnel.

Other objects and advantages will become apparent from the following description wherein reference is made to the drawings in which.

Figure 1:
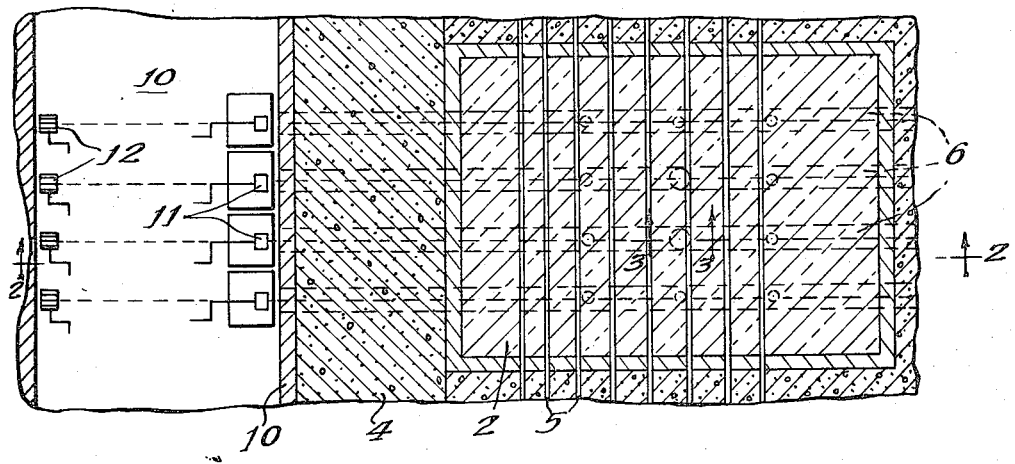
Fig. 1 is a diagrammatic horizontal sectional view of a neutronic reactor with the present invention installed.
Figure 2:
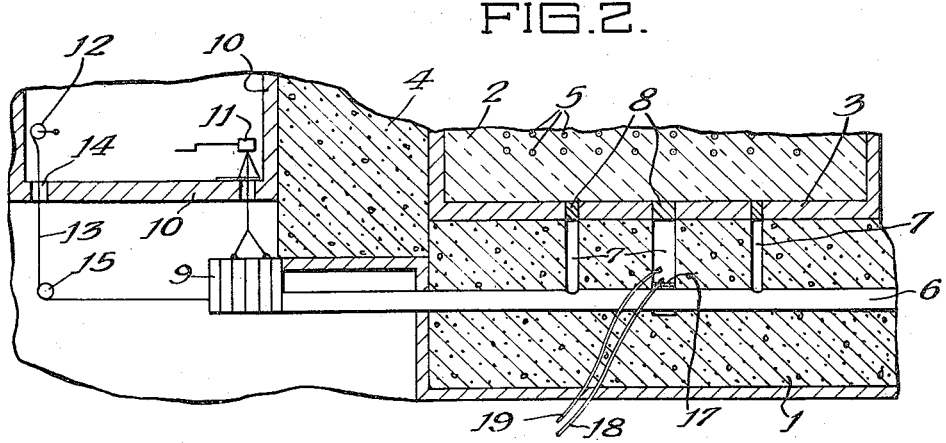
Fig. 2 is a fragmentary vertical sectional view of the reactor and the present invention, taken on line 2—2 of Fig. 1.

Referring to the drawings, the neutronic reactor or pile comprises a concrete foundation 1 which supports a generally cubic mass 2 of graphite moderator, the outer portion of which forms a reflector, the mass 2 being enclosed on all faces by an iron thermal shield (shield for thermal neutrons) 3. A heavy biological shield 4 of neutron absorbing material such as hydrogenous concrete encloses the mass 2 and its thermal shield 3 except on the bottom of the pile where the foundation 1 itself forms a biological shield. Water cooled tubes 5 extend fore and aft through the mass and receive fissionable material in a well-known manner. The graphite moderator 2 and the fissionable material in the tubes 5 comprise the active portion of the reactor.

In accordance with the present invention, instrument ducts 6 suitable for accommodating ion chambers are imbedded in the concrete foundation 1 of the mass beneath and preferably in uniformly spaced relation to the bottom thermal shield 3 at the central portion of the reactor. The ducts are shielded from the mass by the concrete of the foundation to reduce to a minimum leakage of neutrons and radiations thereinto. The ducts 6 preferably are steel tubes of 8" diameter.

The ducts 6 extend entirely across the reactor at right angles to the tubes 5 and project beyond opposite faces of the pile at their ends. In the illustrative example, four ducts 6 are provided and are positioned to pass beneath the central portion of the mass 2. Each duct 6 is provided with a plurality of upright risers 7, each of which extends from the duct 6 through the thermal shield 3 to the base of the mass 2. The risers 7 may be formed of simple bores through the concrete foundation 1 and shield 3, or comprise metal tubes. The risers 7 are closed at the top by lead windows 8 which stop gamma rays and radiations other than neutrons and, as compared to materials containing cadmium and other neutron absorbing materials, afford relatively free passage of neutrons into the ends of the risers. For example, cadmium has an absorption cross-section of $2950 \times 10^{-24}$ cm.$^2$ and a danger coefficient of 870 whereas lead has an absorption cross-section of $0.18 \times 10^{-24}$ cm.$^2$ and a danger coefficient of 0.03. Thus lead affords a relatively free passage for neutrons. Any reduction in neutrons passing through the windows 8 is proportional to the thickness of the lead and consequently a definite percentage of the neutron density in the mass can be measured in the ducts 6.

The ends of the ducts 6 may be closed by suitable hydrogenous concrete blocks 9 which are handled from behind a shield platform 10 by crank operated winches 11.

In order to introduce an ion chamber into one of the ducts 6 and position it beneath the preselected riser 7 thereof, crank operated winches 12 are provided, one winch at each end of each duct 6 and cables 13 are wound on the winches 12 and extend through suitable passages 14 in the shielding platform 10 and around a shive 15 which directs the cable axially of the associated duct 6.

Figure 3:
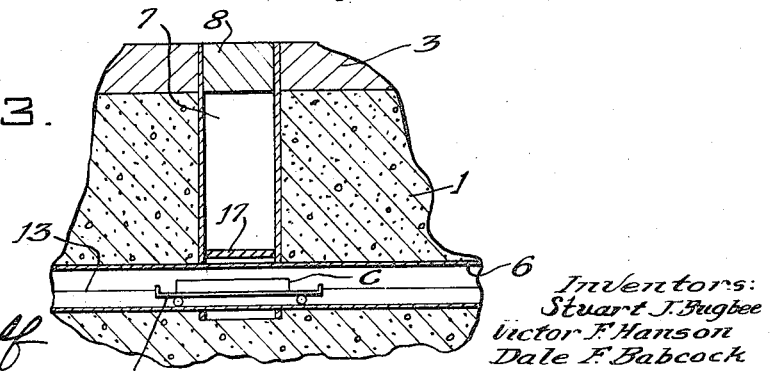
Fig. 3 is an enlarged fragmentary vertical sectional view taken on line 3—3 of Fig. 1, and shows the neutron measuring instrument in operating position.

As illustrated in Fig. 3, a carriage 16 for an ion chamber C is hooked onto the cable 13. By manipulation of the winches 12 at the opposite ends of the associated duct 6, the chamber C can be positioned beneath selected risers 7 thereof. The ion chamber C illustrated is from 2 to 3 feet long and 6 inches in diameter.

Wiring (not shown) from the ion chambers leads out of the ducts to suitable instruments such as current amplifiers and galvanometers in the control room of the pile so as to facilitate the obtaining and recording of data. Other types of instruments may be manipulated in the ducts in like manner.

It will be noted that in the drawings, certain of the risers 7 are somewhat larger than others. The larger risers 7 permit filling with water, being sealed at the base of the water column, to reduce the number of neutrons actually reaching the ion chamber. However, such requires maintenance of the water level in the riser within a 1/100 of an inch of a constant level which is very difficult and would be used only for collecting data for special research purposes. For use for such purposes, in case desired, the bottom of the larger risers 7 may be sealed by neutron passing partitions 17 and inlet and outlet water pipes 18 and 19 provided for admitting water to the proper level.

The ion chamber under one of the larger risers 7 may be connected to a galvanometer which is located in the control room and indicates the power level directly, a shunt connection being provided for increasing the galvanometer range where desired instead of using water in the riser.

The ion chamber in a second large riser may be connected to a deviation galvanometer which indicates with high accuracy very small departures from a predetermined power level. This power level change can be detected readily.

Two of the other smaller risers 7 may be used with smaller ion chambers, each for a dual purpose of obtaining permanent records of pile power and for supplying electric signals for automatic or hand regulation of the pile.

Three of the other smaller risers 7 may be used for ion chambers which are connected to suitable instruments which control automatic shutdown of the pile in case of excessive power development and, as an incident thereto, record the power output.

The tunnels must be purged of radioactive air before they are opened. After removal from the pile, the ion chambers are litfed from their carriers by tongs, thus keeping personnel out of the beam of radiation from the open tunnel and at a safe distance from the active chambers.

It is apparent that modifications may be made of the illustrated embodiment without departure from the scope of the disclosed invention, such modifications being considered as within the spirit and intent of the present invention.

What is claimed is:

1. In combination with a neutronic reactor active portion, the improvement comprising a tunnel beneath and spaced from the active portion and extending beyond opposite faces of the active portion, means forming a passage for neutrons connecting the active portion and tunnel, a carriage in the tunnel, cables connected to said carriage and extending in opposite directions through and out of the ends of the tunnel, and means spaced from opposite faces of the reactor and operable to move the cable in opposite directions selectively.

2. In combination with a neutronic reactor active portion, a plurality of parallel horizontal tunnels beneath and spaced from the active portion, upright risers extending upwardly from the tunnels and into the base of the active portion and positioned to provide a regular geometric design at the central portion of the active portion, said tunnels extending beyond opposite faces of the reactor and being accessible at their ends, cables extending through the tunnels, respectively, and winches at opposite ends of each tunnel and connected to opposite ends of the cable of their associated tunnel for effecting endwise movement of the cable in opposite directions through the tunnel.

References Cited in the file of this patent
UNITED STATES PATENTS

| | | |
|---|---|---|
| 2,287,620 | Kallmann et al. | June 23, 1942 |
| 2,288,718 | Kallmann et al. | July 7, 1942 |
| 2,462,270 | Lipson | Feb. 22, 1949 |

FOREIGN PATENTS

| | | |
|---|---|---|
| 114,151 | Australia | May 3, 1940 |

OTHER REFERENCES

Fermi et al.: Proc. Roy. Soc. (London), Series A, No. 868, vol. 149, pp. 554–7, April 1935.